Oct. 9, 1928.

J. H. ROGERS

BULB STERILIZER

Filed Aug. 28, 1926

Inventor
John H. Rogers

Attorney.

Oct. 9, 1928.
J. H. ROGERS
1,686,928
BULB STERILIZER
Filed Aug. 28, 1926    2 Sheets-Sheet 2
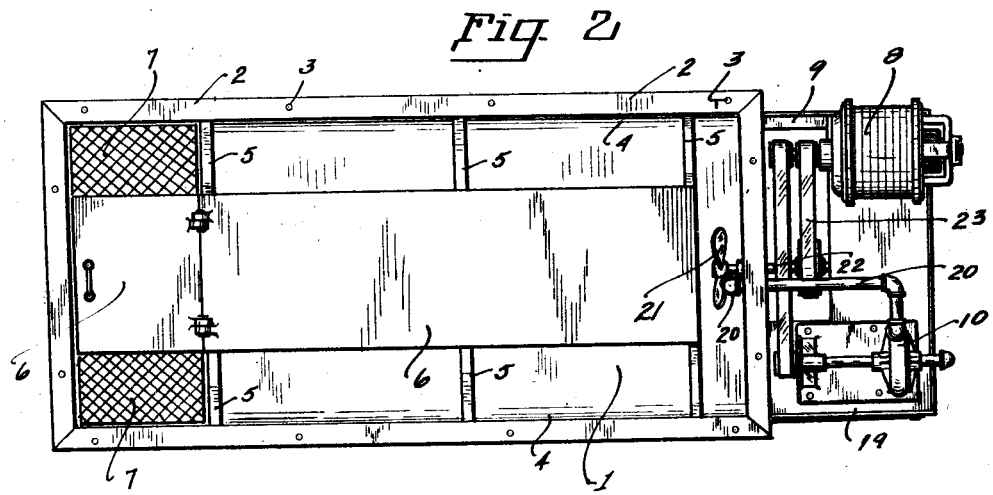
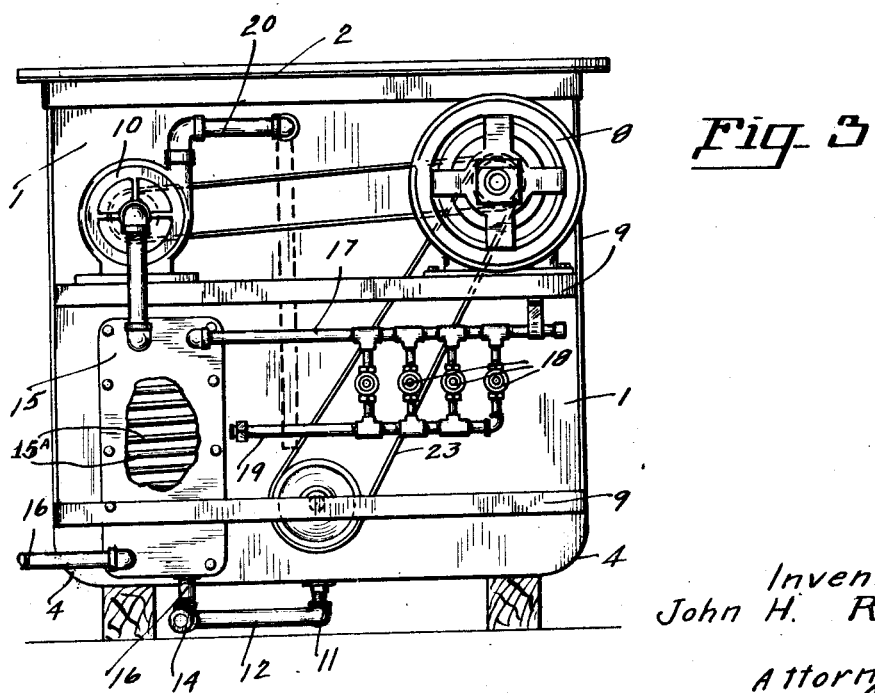
Inventor
John H. Rogers
Attorney
Thomas Bilyeu Patented Oct. 9, 1928.

1,686,928

UNITED STATES PATENT OFFICE.

JOHN H. ROGERS, OF PORTLAND, OREGON.

BULB STERILIZER.

Application filed August 28, 1926. Serial No. 132,210.

The importation of bulbs, tubers, the roots of flowering plants and the interstate shipment of the same has brought about a new condition and the spreading of different diseases and the parasites that commonly feed upon the same has created a demand for a simple and efficient means for the purification of the products and the ridding of the same of all forms of living organisms that feed and thrive upon the same. I have found through experimentation that a device built as hereinafter described and the products processed therethrough under the conditions specified will purify the products and rid the same of all forms of living organisms that feed and thrive thereupon without in any way destroying the germ life of the product being sterilized.

My device and method consists primarily of an immersion tank adapted to the maintaining therein of a treating solution means for the continuous circulation of the solution therein and for the drawing off of the solution from within the tank and the circulation of the same through a heat chamber without the tank and the redistribution of the heated solution back into the tank. Power means being provided for the circulation of the liquid within and without the tank and for a fine adjustment of the heat medium, as live steam to be admitted into the heating chamber. A baffle plate runs substantially the length of the tank and substantially near the bottom of the same which permits of the placing thereupon of the articles to be treated and processed. The circulation, and agitation, of the liquid within the tank is accomplished, in a preferred form, through a screw propeller. I have found best results obtained wherein the propeller forces the warmed solution circulation beneath and around the substantially horizontal diaphragm running longitudinally of the tank. A screen is placed over the outlet end of the circulation pipe.

One of the objects of my invention consists in the maintaining of a fine adjustment of the temperature and in maintaining a variation of the temperature within the prescribed working limits.

Still further objects of my invention consist in providing a sterilizer having commercial capacity and one that will permit of the passing of a substantial quantity of products therethrough, continuously, without, in any way, impairing the efficiency of the same, With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings

Fig. 2 is a top plan view of the mechanism shown in Fig. 1.

Fig. 3 is an end view taken on line 3—3 of Fig. 2 looking in the direction indicated.

Like reference characters refer to like parts throughout the several views—

Figure 1:
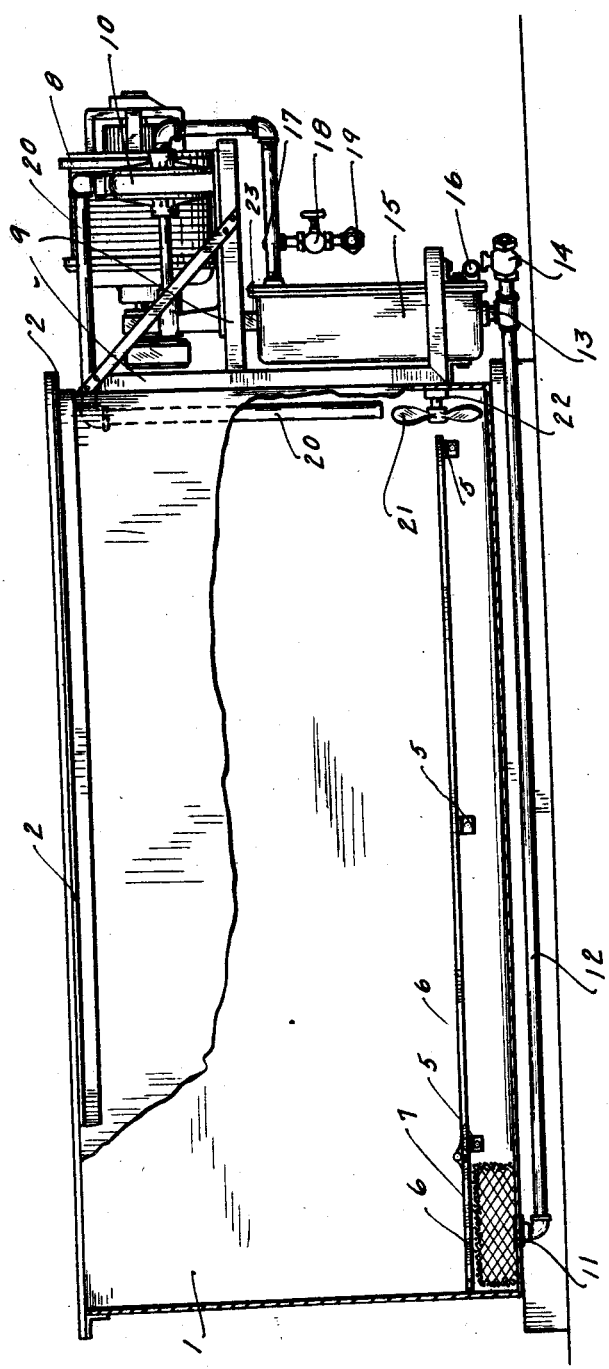
Fig. 1 is a side elevation, partially in section, of the assembled device.

1 is the tank having bottom, side and end walls and having a rim 2 formed about the upper edge of the same and projecting outwardly therefrom and having a series of holes 3 in spaced relationship therethrough to facilitate the securing of a platform member thereto or to permit of the engagement therewith of a fibrous material member thereupon upon which the operator may step without fear of being thrown into the vat through slipping as would be the case were the same of a hard material as steel or other metal. To facilitate the maintaining of the tank member in a sanitary condition within and to permit of the easy cleaning of the same I preferably make the meeting of the walls with the bottom rounded as shown at 4. Cross members 5 connect the side walls and are disposed in spaced relation with the bottom and should be of sufficient strength to support the weight of the bulbs being superposed thereupon. A substantially horizontal diaphragm 6 is placed upon the cross members and is supported thereby. One end of the diaphragm is in hinged relation with the main body member to permit the removal and access to the screen 7 placed therebelow. The substantially horizontal diaphragm serves the purpose of supporting the materials to be treated and processed and at the same time to diffuse the warmer treating liquids to be readmitted into the solution, the object of the diffusion being to maintain an even temperature within all parts of the treating solution. A further object of the diaphragm is to permit of a uniform agitation of all of the treating solution within the chamber. A power unit 8, as an electric motor, energizes the device and furnishes the motive power for operating the same. The operating mechanism is properly supported upon a bracket support 9 that is secured to the exterior of the vat or tank. The power unit is belted to a circulation pump. I have found best results to be obtained through the use of a centrifugal pump of the open runner type. The treatment and processing of bulbs and other material releases a substantial quantity of covering matter from the articles being treated and care should be exercised to prevent this foreign matter from getting into the circulation system of the device. This is accomplished primarily through the action of the screen 7 which is placed over and above the outlet 11 at the low point within the tank. This outlet gives best results if placed at the opposite end of the tank to that at which the treating solution material is entered. Drain and circulation pipe 12 connects the outlet 11 with the inlet connection 13 that leads to the heating chamber 15. If it is desired to drain the tank of the treating solution the valve 14 is opened thus permitting of the free draining of the tank. The heating chamber 15 is supplied with coil 15<sup>A</sup> through which live steam from a source, not here shown, is passed. The coil 15<sup>A</sup> is provided with an exterior supply pipe 16 and an exhaust pipe 17. To control the exhaust of the steam from the pipe 17, there has been provided a multiple of valves 18, here shown as four in number, which connect the exhaust pipe 17 with the pipe 19, which last pipe leads the exhaust steam to a condenser, or whatever other means not shown, may be provided to take care of it. The reason for providing a multiple of small valves 18 instead of one large one is that it has been found, for the particular purpose, that the smaller valves afford a better means for regulating the heating of treating fluid passing through the chamber 15 and around the coil 15<sup>A</sup> than does a single large valve.

The treating solutions are passed through the heat chamber to increase the temperature thereof and are then passed through the circulation pump 10 and are readmitted into the treating tank through the inlet pipe. The same being deposited at or near the agitator and circulation propeller wheel 21 disposed in one end at or near the bottom of the tank. The circulation wheel is mounted upon the propeller shaft 22 and is driven through the action of belt 23 and the prime mover 8.

For the sterilization of most bulbs and other flower propagating roots as well as tubers of different varieties I have found that sterilization is effected in so far as most pests and living organism and parasities are concerned wherein a free circulation is maintained at approximately 110 degrees Fahrenheit and wherein this uniform temperature is maintained for a period of approximately three hours of duration. The materials to be processed should be so placed within the vat or tank as to permit of a circulation of the treating solutions therearound.

While the form of mechanism and the methods as herein outlined have given satisfactory results over long commercial trials, yet I do not wish to be limited to the specific form of construction nor to the specific temperature range as herein outlined. Nor to confine the invention to the one form of embodiment herewith shown and described, nor to the specific range of temperature, nor to the time of treatment, as it is susceptible of embodiment in various forms, all coming within the scope of the claims which follow.

What I claim is—

1. In a bulb sterilizer, an oblong tank for holding a liquid solution, a submerged horizontal diaphragm in said tank for supporting the products being sterilized, said diaphragm being elevated above the bottom and spaced from the side walls of said tank to permit a liquid contained in said tank to circulate freely thereabout; an agitator at one end of said tank adapted to cause a liquid contained therein to circulate toward the opposite end and to pass about the products resting upon said diaphragm, said agitator being located at one end of said diaphragm and vertically positioned relative thereto to enable the current of greatest strength created thereby to pass immediately above and below said diaphragm thereby carrying the refuse matter liberated from the products to the end of the tank opposite said agitator, a liquid discharge outlet in the end of the tank opposite said agitator, means preventing the entrance of liberated refuse matter into said discharge outlet, a liquid outlet adjacent the aforesaid agitator adapted to return the liquid passing through the outlet to said tank, and means to heat the liquid as it passes from the outlet to the inlet.

2. In a bulb sterilizer, a tank adapted for holding a liquid or sterilizing solution, a horizontal member within said tank adapted for supporting the substances being treated therein, said horizontal member being positioned to allow the liquid within said tank to pass between it and the bottom of the tank and between its lateral edges and the sides of the tank; a revolving propeller at one end of said tank adapted for propelling the liquid therein toward the opposite end thereof, said propeller being positioned relative to said support member so that the greatest amount of liquid displacement occasioned thereby occurs immediately above and below said support member, whereby tending to liberate refuse matter from said substances and deposit the same at the end of the tank opposite said propeller.

3. In a bulb sterilizer, a tank adapted for holding a liquid or sterilizing solution, a horizontal member within said tank adapted for supporting the substances being treated therein, said horizontal member being positioned to allow the liquid within said tank to pass between it and the bottom of the tank and between its lateral edges and the sides of the tank; a revolving propeller at one end of said tank adapted for propelling the liquid therein toward the opposite end thereof, said propeller being so positioned relative to said support member that the greatest amount of liquid displacement occasioned thereby occurs immediately above and below said support member, whereby tending to liberate refuse matter from said substances and deposit the same at the end of the tank opposite said propeller, a liquid discharge outlet in the end of the tank opposite said agitator, a screen preventing the entrance of liberated refuse matter into said dischare outlet, a liquid inlet adjacent the aforesaid agitator adapted to return the liquid passing through the outlet to the tank, and means to heat liquid as it passes from the outlet to the inlet.

JOHN H. ROGERS.